United States Patent [19]

Ronlan

[11] Patent Number: 5,431,726
[45] Date of Patent: Jul. 11, 1995

[54] BALANCING COMPOSITION

[75] Inventor: Alvin Ronlan, Fort Lauderdale, Fla.

[73] Assignee: Performance Products Corporation, Philadelphia, Pa.

[21] Appl. No.: 738,885

[22] Filed: Aug. 1, 1991

[30] Foreign Application Priority Data

Nov. 9, 1990 [SE] Sweden ................. 9003577

[51] Int. Cl.⁶ .............. C09D 101/00; C09K 3/00; C09K 3/12
[52] U.S. Cl. ............................ 106/266; 524/166
[58] Field of Search .................. 106/266; 524/166

[56] References Cited

U.S. PATENT DOCUMENTS

| | | | |
|---|---|---|---|
| 2,856,301 | 10/1958 | Badger et al. | 106/266 |
| 3,402,237 | 9/1968 | Hotzinger | 106/253 |
| 3,453,127 | 7/1969 | Marotta et al. | 106/253 |
| 3,755,189 | 8/1973 | Gilchrist et al. | 106/253 |
| 4,051,884 | 10/1977 | Bourne et al. | 152/330 L |
| 4,383,783 | 5/1983 | Kruka et al. | 106/266 |
| 4,474,608 | 10/1984 | Goldberg | 106/253 |
| 5,098,609 | 3/1992 | Iruvanti et al. | 106/266 |

FOREIGN PATENT DOCUMENTS 654858  7/1951  United Kingdom ......... 106/266
1442526 12/1988 U.S.S.R. .

Primary Examiner—David Brunsman
Attorney, Agent, or Firm—Eckert Seamans Cherin & Mellott

[57] ABSTRACT

A tire gel balancing composition having a Storage modulus of between 3000 and 15000 Pa and the Specific Gravity less than 1000 kg/m³ in the temperature range between −20° and +90° C., preferably its Storage modulus is about 9000 Pa, is capable of balancing tires by being able to flow under the vibrations caused by imbalance in a wheel assembly. The composition preferably comprises a mixture of: 1) paraffinic oils, polybutene oils, polyol esters, including castor oil, or polyol ethers; 2) hydrophobic or hydrophilic fumed silica; 3) polyalkyl-methacrylates, styrene-ethylene-propylene block copolymers or polyhydroxycarboxylic acid derivatives; and optionally corrosion inhibitors and antioxidants.

21 Claims, 2 Drawing Sheets

BALANCING COMPOSITION

FIELD OF INVENTION.

The present invention relates to chemically inert, low density gel compositions for use in eliminating imbalances in motor vehicle wheel assemblies, a method for preparation of such compositions as well as the use of such compositions.

BACKGROUND OF THE INVENTION.

Imbalance in a truck or car wheel assembly (tire plus rim) due to imperfect tire or rims causes vibrations which, apart from the discomfort to the driver and any passengers, dramatically can increase the tire wear as well as mechanical wear. Traditionally imbalance is remedied by fastening lead weights on the wheel rim. However, this balancing technique, being of a static nature, cannot compensate for changes in load (i.e. deformation of the tire), uneven wear of the tire, dirt collection of the rim, and the like. Therefore the balancing by lead weights must be repeated several times during the life time of a tire. The present invention is based on the fact that vibrations caused by imbalance in a wheel assembly can induce a motion in a liquid inside the tire in a direction that will diminish the vibrations and the imbalance. However, to utilize this "vibrational pressure" to achieve balancing of a wheel assembly (that is the gravitational center is in the intersection between the rotational plane and the axis of rotation) is by no means trivial. If a free flowing liquid such as water is introduced into a spinning tire, any movement of this mass caused by a "vibrational pressure" would immediately be counteracted by the centrifugal force, which frequently exceeds $100 \times g$ during normal driving, resulting in an oscillating movement of the liquid with no balancing effect.

SUMMARY OF THE INVENTION

I have now invented certain gels in which the movement caused by the vibrational pressure in an imbalanced wheel assembly is only offset to a certain extent by the centrifugal force, allowing a steady state to be formed in which the gels are not evenly distributed around the inner rim of the tire (by even distribution, I refer to distribution around the inner rim of the tire, due to the centrifugal, force in such a way that the surface of the gel is always at the same distance from the rotational axis). The equilibrium distribution is determined by the density and the viscoelastic (rheological) properties of the composition, the vibrational pressure (the amplitude and frequency of the vibrational waves), and the centrifugal force excised on the composition. The vibrational pressure caused by imbalance is determined by the amount (weight) of the imbalance, the weight of the motor vehicle (pressure on the tires) and the speed of the motor vehicle in a roughly proportional manner, i.e.

Vibrational Pressure=Constant×(Weight of Imbalance)×(Vehicle weight)×(Vehicle Speed)

It is of importance to notice that this Vibrational Pressure is independent of the properties of the balancing gel and the diameter if the tire. The centrifugal force excised on a composition located on the inside rim of a tire is proportional with the density of the composition and the square of the rotational speed. The stress caused by the centrifugal force in such a composition, if unevenly distributed, can be estimated by the equation:

$$\Delta P = [d \times V^2/(12,96 \times r)] \times (r - r_i)$$

where $\Delta P$ is the pressure drop (in Pascal) between the parts of the unevenly distributed balancing composition at distances (in meters) $r_i$ and $r$ respectively from the axis of rotation, d is the density of the balancing composition (kg/m$^3$), V is a dimensionless number equal to the speed of the vehicle in kilometers per hour (KMH), r is the inner radius of the tire, and $r_i$ is the distance from the rotational axis to the "top" layer of the balancing material. The actual stress is determined by the distance between the thinnest and the thickest parts and by the pressure drop (the "slope" of the balancing composition).

The displacement of a balancing gel required to offset a certain imbalance is determined by the weight and the nature of the imbalance as well as by the diameter of the tire.

Lets consider an extreme case, a standard 22 inch truck tire with a static imbalance of 300 g in one heavy spot. 300 g is the maximum imbalance encountered in practice. In order for the balancing composition to balance this heavy spot the sloping layer should contain $300 \times \pi^2/4$ g of mass, that is 740 g. The width of the balancing composition layer is of the order 10 cm. Assuming that the specific weight of the balancing composition is 900 kg/m$^3$ and that the thickness of the film increases linearly to its thickest point opposite the heavy spot, we can calculate that the film is approximately 3.3 mm thicker at the point opposite the heavy spot corresponding to a stress of approximately 14 Pa. A similar calculation for a standard 11 inch car tire with a static imbalance of 90 g in one heavy spot (90 g is the maximum imbalance encountered in practice), assuming that the width of the balancing composition layer is of the order 7 cm, indicates that the film is approximately 2.3 mm thicker at the point opposite the heavy spot corresponding to a stress of approximately 19 Pa. Using the estimates and the formula above I reach the estimates shown in Table 1 for pressure drops and stress induced by the centrifugal force on the balancing composition.

TABLE I

| Stress induced in unevenly distributed balancing gel by centrifugal force in rolling tires of varying diameter. | | | | | | | | | | | |
| --- | --- | --- | --- | --- | --- | --- | --- | --- | --- | --- | --- |
| | | TRUCK | | | PASSENGER CAR | | | TRUCK | CAR | TRUCK | CAR |
| d kg/m3 | V km/h | r m | $r_i$ m | Imbalance g | r m | $r_i$ m | Imbalance g | $\Delta P$ Pa | $\Delta P$ Pa | Stress Pa | Stress Pa |
| 900 | 120 | 0.5 | 0.501 | 92 | 0.3 | 0.301 | 38 | 2000 | 3333 | 1 | 4 |
| 900 | 120 | 0.5 | 0.502 | 183 | 0.3 | 0.302 | 77 | 4000 | 6667 | 5 | 14 |
| 900 | 120 | 0.5 | 0.503 | 275 | 0.3 | 0.303 | 116 | 6000 | 10000 | 11 | 32 |
| 900 | 120 | 0.5 | 0.504 | 367 | 0.3 | 0.304 | 154 | 8000 | 13333 | 20 | 57 |
| 900 | 120 | 0.5 | 0.505 | 459 | 0.3 | 0.305 | 193 | 10000 | 16667 | 32 | 88 |
| 900 | 120 | 0.5 | 0.506 | 550 | 0.3 | 0.306 | 231 | 12000 | 20000 | 46 | 127 |

TABLE I-continued

Stress induced in unevenly distributed balancing gel by centrifugal force in rolling tires of varying diameter.

| | | TRUCK | | | PASSENGER CAR | | | TRUCK | CAR | TRUCK | CAR |
|---|---|---|---|---|---|---|---|---|---|---|---|
| d kg/m3 | V km/h | r m | r$_l$ m | Imbalance g | r m | r$_l$ m | Imbalance g | ΔP Pa | ΔP Pa | Stress Pa | Stress Pa |
| 1100 | 120 | 0.5 | 0.501 | 112 | 0.3 | 0.301 | 47 | 2444 | 4074 | 2 | 4 |
| 1100 | 120 | 0.5 | 0.502 | 224 | 0.3 | 0.302 | 95 | 4889 | 8148 | 6 | 17 |
| 1100 | 120 | 0.5 | 0.503 | 336 | 0.3 | 0.303 | 141 | 7333 | 12222 | 14 | 39 |
| 1100 | 120 | 0.5 | 0.504 | 448 | 0.3 | 0.304 | 188 | 9778 | 16296 | 25 | 69 |
| 1100 | 120 | 0.5 | 0.505 | 561 | 0.3 | 0.305 | 235 | 12222 | 20370 | 39 | 108 |
| 1100 | 120 | 0.5 | 0.506 | 673 | 0.3 | 0.306 | 283 | 14667 | 24444 | 56 | 156 |

By careful tuning of the density and the viscoelastic properties of the gel composition a perfect, self adjusting balancing of a tire assembly can be achieved by just introducing such a composition into the tire (tube tires or tubeless). The Gel is either introduced through the valve stem of the tire or spread evenly around the inner rim with a spatula before mounting the tire. After driving 2-10 km all vibrations due to imbalance cease.

The most important rheological properties of the balancing composition are its Storage Modulus, $G'$, and its Loss Modulus, $G''$. $G'$ is a measure of the strength of the gel, that is the strength and the number of bonds between the molecules of the gel former. I have found that in order to achieve satisfactory balancing properties the value of $G'$ should be in the range 3000 to 15000 Pa. A strain sweep of a functional balancing gel is shown in FIG. 1. A very satisfactory balancing composition has a value of $G'$ around 9000 Pa. A typical shear stress/viscosity-shear rate curve for a well working balancing composition is shown in FIG. 2. The lower limit of $G'$ for a well functioning balancing composition has been determined experimentally to be 3000 Pa.

According to the theoretical reasoning above, the density of the balancing gel should be irrelevant. However, to my surprise I have discovered that the density of the balancing gel is indeed of great importance. In practical tests low density gels (d <900 kg/m$^3$) based on various hydrocarbon oils consistently performed much better than high density gels (d >1000 kg/m$^3$) based on various thickened glycols. This was particularly true for passenger cars and buses, where high density compositions failed irrespective of viscoelastic properties. Of equal importance as the density and the viscoelastic properties is the long term stability in service of the balancing gel, the performance at various temperatures of the gel, and the chemical inertness of the gel.

An acceptable tire balancing gel must remain functional during the life time of the tire and under the various driving conditions, in particular it must remain functional within the normal driving speed interval, 0 to approximate 160KMH, and within the normal temperature range, $-30°$ C. to $+90°$ C., experienced i service. Furthermore, the tire balancing gel must not have any harmful effect on the tire, in particular it should not affect the inner lining of the tire or cause any damage to the cord or other tire parts if it accidentally reaches such parts (i.e. by puncture of the tire).

MINIMUM CRITERIA FOR A FUNCTIONAL BALANCING GEL

Rheology: 3000 Pa < Storage Modulus ($G'$) < 15000 Pa.
Loss Modulus ($G''$) ≦ $G'$. Critical yield Stress > 25 Pa.
Specific gravity < 1000 kg/m$^3$ Volatility: Less than 6% (by weight) evaporation loss after 10 hours at 99 ° C.
Pour point of base liquid: $< -15°$ C. (ASTM D97)
Solubility: Insoluble in water, hydrophobic
Separation stability: Less than 1% separation (by weight) of the base oil after 24 hours att 125×g and 100° C.
Chemical reactivity: No effect on rubber or other polymers, non-corrosive to metals.

The invention resides in a tire balancing gel composition which is preferably applied to and contained within an air cavity of a tire of a motor vehicle, characterized in that the tire balancing gel composition comprises: (A) 80 to 95% by weight of an oil, or mixture of oils, selected from the class consisting of: (i) polybutene oils preferably of maximum specific gravity of about 900 kg/m$^3$ and a pour point (ASTM D97) of less than $+2°$ C., (ii) paraffinic or naphthenic oils preferably having a maximum specific gravity of about 900 kg/m$^3$ and a pour point (ASTM D97) of less than $+2°$ C., (iii) castor oil and other polyol esters preferably having a pour point (ASTM D97) of less than $+2°$ C., (iv) polypropyleneglycol alkyl ethers preferably having a pour point (ASTM D97) of less than $+2°$ C., and (v) polypropoyene oils preferably having a pour point (ASTM D97) of less than $+2°$ C.; (B) 4 to 15% by weight of a gel former selected from the class consisting of: (i) fumed silica preferably having a BET surface in the range from about 50 to about 400 m$^2$/g, (ii) metal soaps, and (iii) clay; and, (C) up to 5% of a viscosity index improving agent selected from the class consisting of: (i) poly-alkyl-methacrylates preferably with a molecular weight of about 100,000 to about 900,000, (ii) styrene-ethylene-butylene-styrene block copolymers and styrene-ethylene-propylene block copolymers preferably having a styrene rubber ratio between about 13/87 and about 37/63, (iii) polyisobutylenes, and, (iv) polyhydroxycarboxylic acid esters or amides, in which the tire balancing gel composition preferably has a storage modulus ($G'$) value between about 3000 Pa and 15000 Pa at 22° C., a loss modulus ($G''$) value smaller than the storage modulus, a critical yield stress value exceeding 15 Pa at 22° C., a specific gravity less than 1000 kg/m$^3$ at 22° C., an evaporation loss value of less than 6% by weight after about 10 hours at 99° C., and an oil separation value of less than 1% after 24 hours art 125×g and 100° C. The tire balancing gel composition preferably has a storage modulus value of 9500 Pa at 22° C.

Particular examples of the tire balancing gel composition of the invention as described hereinabove include the following compositions: (1) a tire balancing gel composition in which the base oil (A) is a polybutene oil preferably having a kinematic viscosity (ASTM D445) value between 1005 and 8910 SUS at 38° C., a pour point (ASTM D97) value between about $-35°$ and −15° C., a specific gravity between about 850 and 890 kg/m³, and an average molecular weight between 460 and 750, the gel former (B) is a hydrophobic fumed silica preferably having a BET surface area of between about 70 and 400 m²/g, and the viscosity index improving agent (C) is a styrene-ethylene-propylene block copolymer preferably having a styrene/rubber ratio of about 37/63; (2) a tire balancing gel composition in which the base oil (A) is castor oil preferably having a kinematic viscosity value of about 25 cSt at 25° C. and a specific gravity of about 950 kg/m³, the gel former (B) is a hydrophilic or hydrophobic fumed silica preferably having a BET surface area of between about 70 and 400m²/g, and the viscosity index improving agent (C) is a pylyhydroxycarboxylic acid amide; and, (3) a tire balancing gel composition in which the base oil (A) is an alkylpolypropolyene glycol ether preferably having a kinematic viscosity value (ASTM D445) of about 36.9 cSt at 100° C., a pour point value (ASTM D97) of about −29° C., a specific gravity of about 985 kg/m³, and an average molecular weight of about 2,080, the gel former (B) is a hydrophilic or hydrophobic fumed silica preferably having a BET surface area of between about 70 and 400 m²/g, and the viscosity index improver (C) is a polyhydroxycarboxylic acid amide.

The invention also resides in a method for balancing a motor vehicle wheel assembly including a tire, comprising: applying to the inner surface of the tire, either directly or indirectly through the valve stem of the tire, a tire balancing gel composition as described hereinabove; mounting the wheel assembly including a tire on a motor vehicle; and, driving the vehicle for a distance sufficient to allow the gel balancing composition to balance the wheel assembly.

DETAILED DESCRIPTION OF THE INVENTION

Figure 1:
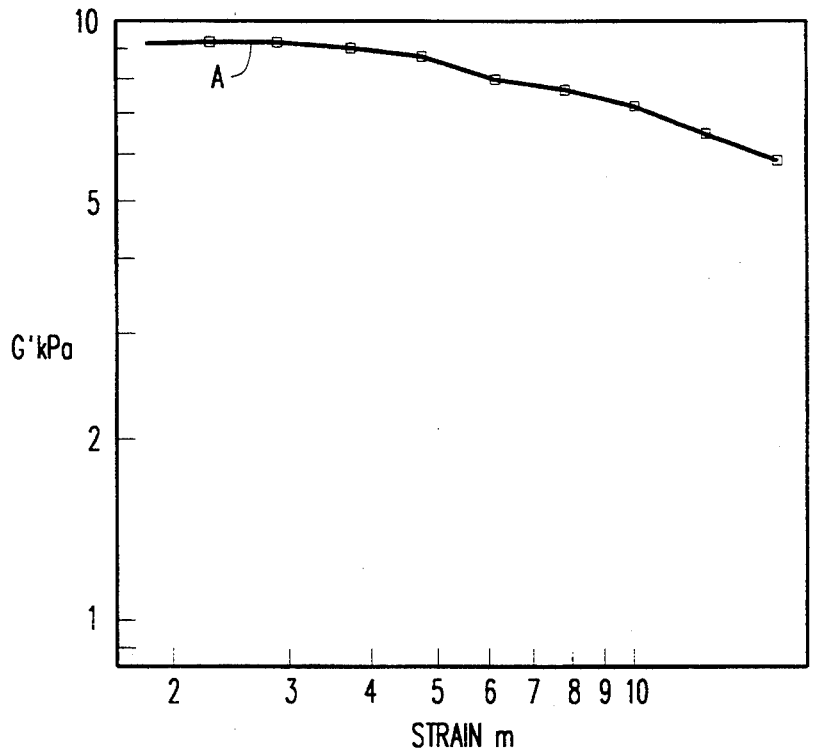
FIG. 1 Shows a plot of the logarithm of the Storage Modulus, G' (in Pa) versus the strain (in m) for the composition described in Example 1.

Based on the criteria mentioned above and extensive experiments and field evaluations a number of functional balancing gels have been invented.

The inventive compositions comprise three major components, namely, an oil, a gel former, and a viscosity index improving agent.

Among the oils useful in the practice of the invention are paraffinic or naphthenic oils having a maximum specific gravity of 880 kg/m³ at 25° C. and a maximum pour point (ASTM D 97) of −15° C.; polybutene oils having a maximum specific gravity of 900 kg/m³ at 25° C. and a maximum pour point (ASTM D 97) of −15° C.; synthetic or naturally occurring polyol esters, such as pentaerythritol esters of fatty acids, castor oil and jojoba oil; and alkyl ethers of polyols or polyglycols, such as alkyl polypropylene glycol ethers. Other oils which are expected to be useful in the practice of the invention other synthetic hydrocarbon oils such as polypropylene oils and poly-alpha-olefins. Specific examples of oils useful in the practice of the invention are 1) a polybutene oil having kinematic viscosity as per ASTM D445 of about 50 cSt at 99° C., pour point per ASTM D 97 of −26° C., specific gravity 868 kg/m³, and average molecular weight 610, available from Amoco Chemical Company, Chicago, Ill., U.S.A., under the trade designation H-25; 2) No. 1 Castor oil which is a mixture of the glyceryl triesters of ricinoleic acid (approximately 89.5%), linoleic acid (approximately 4.2%), oleic acid (approximately 3.0%), palmitic acid (approximately 1.0%), stearic acid (approximately 1.0%), dihydroxystearic acid (approximately 0.7%), linolenic acid (approximately 0.3%), and eicosanoic acid (approximately 0.3%); and 3) an alkyl polypropylene glycol ether having kinematic viscosity as per ASTM D445 of about 36.9 cSt at 100° C., pour point per ASTM D 97 of −29° C., specific gravity 985 kg/m³, and average molecular weight 2080, available from Union Carbide Corporation, Danbury, Conn., U.S.A., under the trade designation UCON LB 1145.

Gel formers useful in the practice of the invention are fumed silica (hydrophobic or hydrophilic), asbestos fibers, bentonite clay and metal soaps.

Specific examples of gel formers useful in the practice of the invention are a polydimethylsiloxane-coated fumed silica having a BET surface area of 90 +/−20 m²/g containing approximately 5% chemically bonded carbon, available from Degussa under the trade designation Aerosil®R202, and a fumed silica having a BET surface area of 200 +/−20 m²/g, available from Cabot Corporation under the trade designation Cab-O-Sil M-5.

Among the viscosity index improving agents useful in the practice of the invention are poly-alkyl-methacrylates (PAMA), styrene-ethylene-butylene-styrene block copolymers (SEBS), styrene-ethylene-propylene block copolymers (SEP), polyisobutylenes, ethylene-propylene copolymers, hydrogenated butadiene-styrene copolymers, polymers of fumaric acid esters and maleic acid esters, and various polyhydroxycarboxylic acid amides.

Specific examples of viscosity index improovers useful in the practice of the invention are, a PAMA of average molecular weight 480.000 available from Röhm GMBH Chemische Fabrik, Darmstadt, Germany under the trade designation Viscoplex®2-500, a SEP having a styrene/rubber ratio of 37/63, specific gravity 0.92, and tensile strength, psi of 300, available from Shell Chemical Company, Houston, Tex., U.S.A., under the trade name Kraton®G-1701X, and a proprietary polyhydroxycarboxylic acid amide mixture available from BYK-Chemie U.S.A., Conn., U.S.A., under the trade name BYK®-405.

A composition according to the invention typically comprises between about 80 and about 95% by weight of the oil, between about 4 and about 15% by weight of the gel former, and between about 1 and about 5% by weight of the viscosity index improving agent.

Optionally, the composition may also comprise minor amounts of corrosion inhibitors and anti-oxidants.

Figure 2:
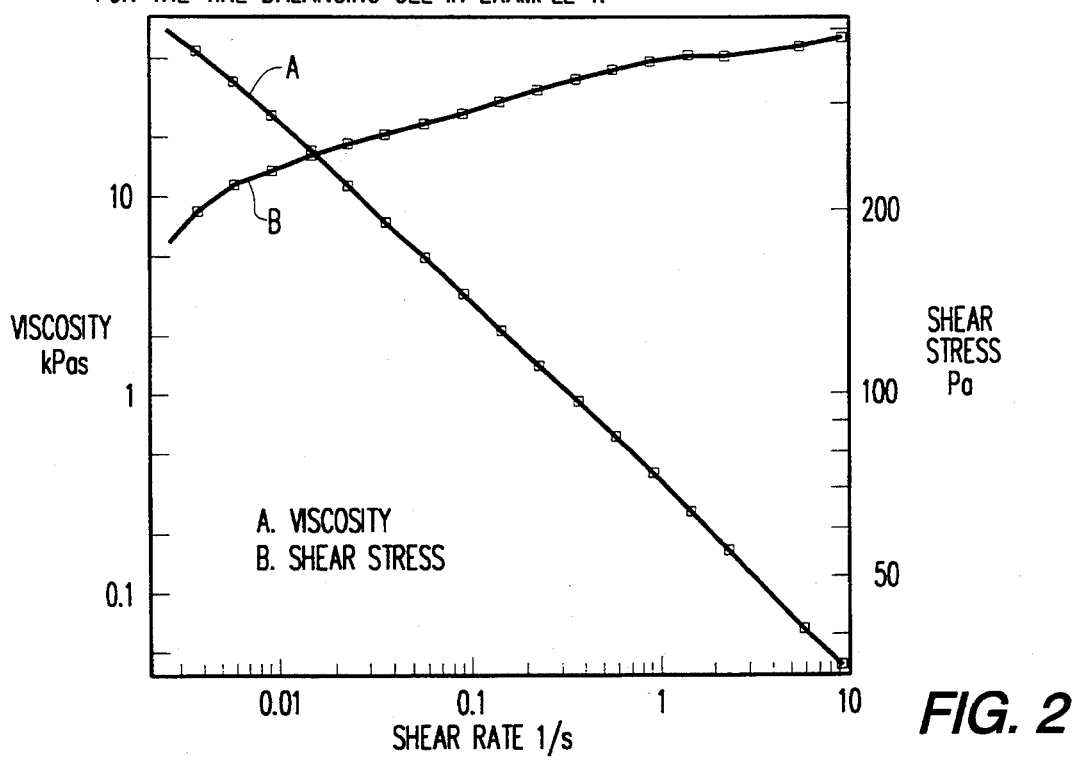
FIG. 2 Shows a plot of the logarithm of the shear stress (in Pa) versus the shear rate (in s⁻¹) for the composition described in Example 1. The left hand end point of the plot curve corresponds to the critical yield stress (174 Pa), i.e. the stress at which break down of the gel network sets in resulting in a drop in the viscosity of the composition.
Figure 3:
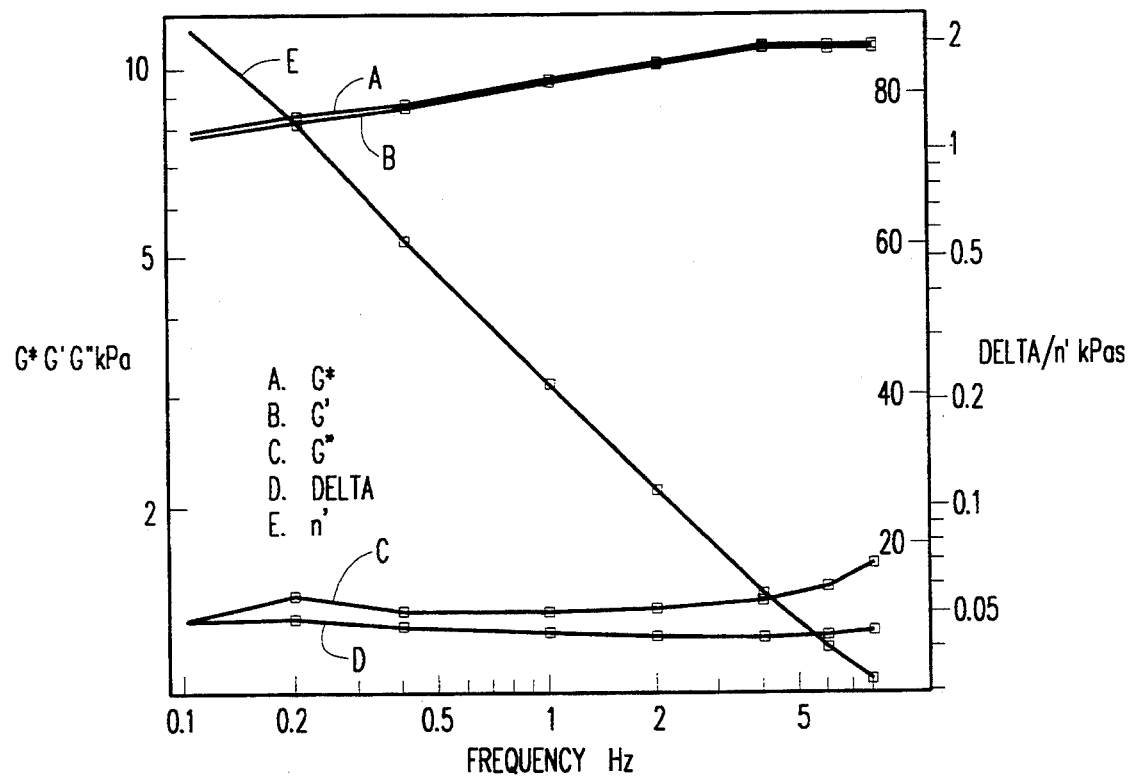
FIG. 3 Shows the results of an oscillation test of the composition described in Example 1.

The gelling effect of the gel formers on the oils is accomplished by the formation of a network of the molecules of the gel former through hydrogen bonding via hydroxy groups or via van der Waals attraction between segments molecules of of the gel former. The number and the strength of these bonds determines the gel strength, and the ability of the gel to support a load (critical yield stress). In FIGS. 1–3 is given a complete rheological characterization of a functional tire balancing gel (Example 1). At loads above the critical yields stress (strong vibrational pressure caused by imbalance) the network breaks down and the composition assumes liquid like character.

An extensive series of compositions satisfying the rheological criteria mentioned above have been prepared using the types of oils and gel formers given above. However none of them satisfies the endurance criteria. All the gel formers have a higher density than the oil, and under the influence of the centrifugal force in a rolling tire, separation invariably occurs after a while. This separation is further aggravated by the increase in temperature (up to 70° C. in normal use) due to friction against the road surface, which decreases the viscosity of the oil. Due to the requirement for low temperature functionality and the effect on the elasticity (becomes too high) of the balancing composition base oils of higher viscosity cannot be used. In the present invention I have discovered that this problem can be solved by the addition of viscosity index improving agents.

Exemplary compositions that were studied are shown in Table II.

The compositions were prepared by known methods.

The resulting compositions were evaluated by rheometry with a computerized Bohlin VOR Rheometer System (from Bohlin Rheology, Lund, Sweden) and in field test using passenger cars, trucks and buses. The car tires were supplied with 500 g of the balancing gels, either by applying the gel to the inner perimeter of the tire before mounting or by introduction through the valve stem. The bus or truck tire were supplied with 1 kg of the gels in the same manner as for the passenger cars. Both tubeless and tube tire were included in the tests, and no difference in balancing capability between the two kinds of tires was observed.

The efficacy and durability of a composition was evaluated by measuring vibrations from the wheel assemblies during a period of 50.000 km driving. Composition that balanced perfectly (no discernible vibrations) in this test, and that showed less than 2% separation of the oil after inspection by the end of the test, were deemed functional.

dimethylsiloxane coated fumed silica, and mixtures thereof; and, (c) about 1–5 % by weight of a viscosity index improving agent component selected form the group consisting of poly-alkyl-methacrylates, styrene-ethylene-butylene-styrene block copolymers, styrene-ethylene-propylene block copolymers, polyisobutylenes, ethylene-propylene copolymers, hydrogenated butadiene-styrene-copolymers, polymers of fumaric acid esters and maleic acid esters, polyhydroxycarboxylic acid esters or amides, and mixtures thereof, in which said components (a), (b) and (c) are provided in said effective amount to gel said tire balancing gel composition and such that said gel undergoes a transformation from gel state to liquid state when subject to an effective amount of vibrational pressures.

2. The tire balancing gel composition of claim 1, in which the specific gravity is less than about 1000 kg/m$^3$ at about 22° C.

3. The tire balancing gel composition of claim 2, in which the critical yield stress value is greater than about 15 Pa at about 22° C., the storage modulus value is between about 3000–15000 Pa at about 22° C., and the loss modulus value is less than or equal to the storage modulus value.

4. The tire balancing gel composition of claim 3, in which said critical yield stress value is greater than about 25 Pa.

5. The tire balancing gel composition of claim 3, in which said storage modulus value is about 9500 Pa.

6. The tire balancing gel composition of claim 3, in which said gel remains functional within a temperature range between about −30° to +90° C.

7. The tire balancing gel composition of claim 2, in which the evaporation loss value is less than about 6% by weight after about 10 hours at 99° C.

8. The tire balancing gel composition of claim 2, in which the oil separation value is less than about 1% after about 24 hours at 125×g and 100° C.

9. The tire balancing gel composition of claim 1, further comprising other additive agents selected from the group consisting of antioxidants and corrosion inhibitors.

TABLE II

| | Component/% Wt | | | | | | | | | | | | | | |
|---|---|---|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
| L-100* | | | 88,5 | 90,5 | | | | | 91,0 | | | | | | |
| H-25 | 88,5 | 91,5 | | | 87,0 | 89,0 | 91,0 | | | | | | | | |
| No. 1 Castor oil | | | | | | | | | | 90,0 | 92,8 | 90,8 | 94,0 | | |
| Ucon LB1145 | | | | | | | | | | | | | | 90,4 | 92,0 |
| Kraton ® 1701X | 1,5 | 1,5 | 2,0 | 2,0 | | | | | | | | | | | |
| BYK ®-405 | | | | | | | | | | 1,2 | 1,6 | | 1,6 | 1,6 | |
| Viscoplex ® 2-500 | | | | | 4,0 | 4,0 | | | 2,0 | | | | | | |
| Aerosil ® R202 | 9,0 | 7,0 | 9,5 | 7,5 | 9,0 | 7,0 | 9,0 | 9,0 | 8,0 | | 8.0 | | 10,0 | | |
| Aerosil 200 | | | | | | | | | | | 6,0 | | 6,0 | 8,0 | 8,0 |
| Functional test | Pass | Pass | Pass | Pass | Pass | Pass | Pass | Fail** | Pass | Pass | Pass | Fail** | Pass | Pass | Fail** |

*Polybutene oil from Amoco, having kinematic viscosity as per ASTM D445 of about 220 cSt at 38° C., pour point per ASTM D 97 of −35° C., specific gravity 850 kg/m$^3$, and average molecular weight 460.

**These compositions failed in the separation test, although the rheological criteria were satisfied.

What is claimed is:

1. A tire balancing gel composition, comprising:
   (a) about 80–95 % by weight of an oil component selected from the group consisting of castor oil,
   (b) about 4–15% by weight of a gel former component selected from the group consisting of hydrophilic fumed silica, hydrophobic fumed silica, poly- 10. The tire balancing gel composition of claim 1, in which said oil component (a) comprises castor oil, said gel former component (b) comprises hydrophilic or hydrophobic fumed silica, and said viscosity improving agent component (c) comprises polyhydroxycarboxylic acid amide.

11. The tire balancing gel composition of claim 1, in which said viscosity index improving agent component (c) is selected from the group consisting of (i) polyalkyl-methacrylates, (ii) styrene-ethylene-butylene-styrene block copolymers and styrene-ethylene-propylene block copolymers, (iii) polyisobutylenes, and, (iv) polyhydroxycarboxylic acid esters or amides.

12. A tire balancing gel composition, comprising: (a) about 80–95% by weight of an oil component comprising castor oil; (b) about 4–15% by weight of a gel former component comprising fumed silica; and, (c) about 1–5% by weight of a viscosity index improving agent component comprising polyhydroxycarboxylic acid amide, in which said components (a), (b) and (c) are provided in said effective amount to gel said tire balancing gel composition and such that said gel undergoes a transformation from gel state to liquid state when subject to an effective amount of vibrational pressures.

13. The tire balancing gel composition of claim 12, in which the specific gravity is less than about 1000 kg/m$^3$ at about 22° C.

14. The tire balancing gel composition of claim 13, in which the critical yield stress value is greater than about 15 Pa at about 22° C., the storage modulus value is between about 3000–15000 Pa at about 22° C., and the loss modulus value is less than or equal to the storage modulus value.

15. The tire balancing gel composition of claim 14, in which the evaporation loss is less than about 6% by weight after about 10 hours at 99° C.

16. The tire balancing gel composition of claim 14, in which the oil separation is less than about 1% by weight after about 24 hours at 125×g and 100° C.

17. The tire balancing gel composition of claim 12, in which the BET surface area of said fumed silica is between about 50–400 m$^2$/g.

18. The tire balancing gel composition of claim 12, in which the gel former component (b) fumed silica is hydrophobic fumed silica.

19. The tire balancing gel composition of claim 12, in which said oil component (a) is castor oil having a pour point value of less than about 2° C., a specific gravity of about 950 kg/m$^3$ and a kinematic viscosity value of about 25 cSt at about 25° C.

20. The tire balancing gel composition of claim 12, in which said gel remains functional within a temperature range between about −30° to +90° C.

21. The tire balancing gel composition of claim 12, further comprising other additive agents selected from the group consisting of antioxidants and corrosion inhibitors.

* * * * *